United States Patent
Hasegawa et al.

(10) Patent No.: US 9,243,093 B2
(45) Date of Patent: Jan. 26, 2016

(54) MODIFIER FOR POLYOLEFIN RESIN

(75) Inventors: Tatsuhiko Hasegawa, Kyoto (JP); Yosuke Nakata, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 123 days.

(21) Appl. No.: 13/988,482

(22) PCT Filed: Nov. 26, 2011

(86) PCT No.: PCT/JP2011/006589
§ 371 (c)(1),
(2), (4) Date: May 20, 2013

(87) PCT Pub. No.: WO2012/070252
PCT Pub. Date: May 31, 2012

(65) Prior Publication Data
US 2013/0244010 A1    Sep. 19, 2013

(30) Foreign Application Priority Data
Nov. 26, 2010   (JP) .................................. 2010-263299

(51) Int. Cl.
| | |
|---|---|
| C08F 220/08 | (2006.01) |
| C09D 133/06 | (2006.01) |
| C08L 23/14 | (2006.01) |
| C08L 23/10 | (2006.01) |
| C08F 255/02 | (2006.01) |
| C08L 23/02 | (2006.01) |
| C08L 23/26 | (2006.01) |

(52) U.S. Cl.
CPC ........... *C08F 220/08* (2013.01); *C08F 255/023* (2013.01); *C08L 23/10* (2013.01); *C08L 23/142* (2013.01); *C09D 133/064* (2013.01); *C08L 23/02* (2013.01); *C08L 2023/42* (2013.01); *Y10T 428/24802* (2015.01)

(58) Field of Classification Search
CPC ...... C08F 220/08; C08F 23/02; C08F 23/142; C08F 23/10
See application file for complete search history.

(56) References Cited

U.S. PATENT DOCUMENTS

| | | | |
|---|---|---|---|
| 5,733,993 A | 3/1998 | Yu et al. | |
| 5,843,577 A * | 12/1998 | Ouhadi et al. | ............. 428/474.7 |
| 6,262,182 B1 * | 7/2001 | Eagan et al. | ................... 525/285 |
| 2001/0003766 A1 * | 6/2001 | Nozaki | ........................... 525/66 |
| 2005/0076146 A1 | 4/2005 | Murakoshi et al. | |
| 2010/0081727 A1 | 4/2010 | Hanefeld et al. | |

FOREIGN PATENT DOCUMENTS

| | | |
|---|---|---|
| EP | 1 579 907 A2 | 9/2005 |
| JP | 50-36540 A | 4/1975 |
| JP | 53-45348 A | 4/1978 |
| JP | 56-109213 A | 8/1981 |
| JP | 04-159311 A | 6/1992 |
| JP | 07-173229 A | 7/1995 |
| JP | 07-206946 A | 8/1995 |
| JP | 08-176356 A | 7/1996 |
| JP | 10-36457 A | 2/1998 |
| JP | 2000-319426 A | 11/2000 |
| JP | 2004-169014 A | 6/2004 |
| JP | 2004-250702 A | 9/2004 |
| JP | 2005-194507 A | 7/2005 |
| JP | 2005-307201 A | 11/2005 |
| JP | 2008-056746 A | 3/2008 |
| WO | 2005/056616 A1 | 6/2005 |
| WO | 2008/066168 A1 | 6/2008 |
| WO | 2008/132083 A1 | 11/2008 |

OTHER PUBLICATIONS

European Search Report dated Jun. 5, 2014, issued in European Patent Application No. 11843350.7 (5 pages).
International Search Report for PCT/JP2011/006589, Mailing Date of Feb. 14, 2012.
Office Action dated Jun. 9, 2015, issued in corresoponding Japanese Patent Application No. 2011-259297, with English translation (12 pages).

\* cited by examiner

*Primary Examiner* — Robert Harlan
(74) *Attorney, Agent, or Firm* — Westerman, Hattori, Daniels & Adrian, LLP

(57) ABSTRACT

Provided are a modifier for polyolefin resin which imparts excellent wettability for water, etc. to a polyolefin resin substrate without decreasing the resin property of the polyolefin resin substrate composed of polyolefin resin, and a polyolefin resin composition containing the modifier and a polyolefin resin. The present invention relates to a modifier for polyolefin resin (K) containing a copolymer (X) having a polyolefin (A) and an unsaturated dicarboxylic acid (anhydride) (B) as a constitutional unit and having an acid value of 50 to 250 mg KOH/g.

16 Claims, No Drawings

MODIFIER FOR POLYOLEFIN RESIN

TECHNICAL FIELD

The present invention relates to a modifier for polyolefin resin which imparts excellent wettability to a polyolefin resin substrate, more specifically, a modifier for polyolefin resin which imparts excellent wettability to a polyolefin resin substrate without impairing the mechanical strength. Herein and below, wettability refers to an affinity for water and is evaluated by wetting tension mentioned later.

BACKGROUND ART

A polyolefin resin is excellent in moldability, rigidity, heat resistance, chemical resistance, electrical insulation properties, and the like, and is inexpensive, so that it is widely used for general purposes as a film, fiber, and other molded products with various shapes. On the other hand, the polyolefin resin is a high-molecular substance that has no polar group in its molecule, so-called non-polar, and that is very inert. Further, the polyolefin resin has high crystallinity and significantly low solubility in solvents, and therefore has problems in adhesiveness, coatability, and the like. Also, the polyolefin resin repels water due to poor wettability for water, and therefore has the problem that an aqueous coating material cannot be applied thereon, and the like.

Conventionally, as a method for improving wettability, there are known a method of subjecting the surface of a thermoplastic resin substrate, for example, a polyolefin resin molded product to corona treatment or plasma treatment (e.g., see Patent Document 1), a method of adding a surfactant to a polyolefin resin composition to form a molded product (e.g., see Patent Document 2), and the like.

PRIOR ART DOCUMENTS

Patent Documents

Patent Document 1: JP-A-2000-319426
Patent Document 2: JP-A-2004-169014

SUMMARY OF THE INVENTION

Problems to be Solved by the Invention

However, the method of subjecting the surface of a molded product to corona treatment or plasma treatment has the problem that wettability decreases over time after the treatment. Also, the method of adding surfactant to a polyolefin resin composition to form a molded product has the problems that, when the surfactant is added in an amount that exhibits the modifying effect sufficiently, it may impair the mechanical strength (tensile elastic modulus, impact resistance, etc., the same applies hereinbelow) originally owned by the molded product of the polyolefin resin substrate and may cause the bleed out of the surfactant from the molded product, and the like. Therefore, improvements in these problems have been demanded.

An object of the present invention is to provide a modifier for polyolefin resin which imparts excellent wettability for water to a polyolefin resin substrate without impairing the mechanical strength.

Solutions to the Problems

The present inventors have made various investigations in order to solve the above described problems, thereby accomplishing the present invention. That is, the present invention is a modifier for polyolefin resin (K) containing a copolymer (X) having a polyolefin (A) and an unsaturated dicarboxylic acid (anhydride) (B) as a constitutional unit and having an acid value of 50 to 250 mg KOH/g; and a polyolefin resin composition containing the above-described modifier (K) and a polyolefin resin (E).

Effects of the Invention

The modifier for polyolefin resin, and a molded product obtained by molding the polyolefin resin composition containing the modifier according to the present invention have the below-described effects.
(1) The modifier imparts excellent wettability for water to a polyolefin resin substrate without impairing its original mechanical strength.
(2) The molded product has excellent wettability for water and is excellent in its durability.

Mode for Carrying Out the Invention

[Polyolefin (A)]

A polyolefin (A) in the present invention includes a (co)polymer of one or two or more types of olefins and a copolymer of one or two or more types of olefins and one or two or more types of other monomers.

The above-described olefin includes an alkene having a carbon number (abbreviated as C hereinbelow) of 2 to 30, for example, ethylene, propylene, 1- and 2-butene, and isobutene, and an α-olefin having a carbon number of 5 to 30 (1-hexene, 1-decene, 1-dodecene, etc.); and the other monomer includes an unsaturated monomer having a carbon number of 4 to 30 and having copolymerization properties with an olefin, for example, styrene and vinyl acetate.

Specific examples of (A) include an ethylene unit-containing (no propylene unit-containing) (co)polymer, for example, high-, medium-, and low-density polyethylenes, a copolymer of ethylene and an unsaturated monomer having a carbon number of 4 to 30 [butene (1-butene, etc.), an α-olefin having a carbon number of 5 to 30 (1-hexene, 1-dodecene, etc.), vinyl acetate, etc.] (the ratio by weight is preferably 30/70 to 99/1 and more preferably 50/50 to 95/5 from the viewpoints of moldability of a polyolefin resin composition and the amount of double bonds in the terminal and/or the polymer chain of (A)), and the like; a propylene unit-containing (no ethylene unit-containing) (co)polymer, for example, polypropylene, and a copolymer of propylene and an unsaturated monomer having a carbon number of 4 to 30 (said monomers apply herein) (said ratio by weight applies herein); an ethylene/propylene copolymer (the ratio by weight is preferably 0.5/99.5 to 30/70 and more preferably 2/98 to 20/80 from the viewpoints of moldability of a polyolefin resin substrate and the amount of double bonds in the terminal and/or the polymer chain of (A)); and a (co)polymer of olefin(s) having a carbon number of 4 or more, for example, polybutene.

Of these, preferred are polyethylene, polypropylene, an ethylene/propylene copolymer, and a copolymer of propylene and an unsaturated polymer having a carbon number of 4 to 30, and more preferred are an ethylene/propylene copolymer and a copolymer of propylene and an unsaturated polymer having a carbon number of 4 to 30, from the viewpoint of copolymerization properties with an unsaturated dicarboxylic acid (anhydride) (B) and an unsaturated aliphatic hydrocarbon (C) mentioned later.

The number-average molecular weight [abbreviated as an Mn hereinbelow; the measurement is made by the gel permeation chromatography (GPC) method mentioned later, and the same applies hereinbelow] of (A) is preferably 800 to 50,000 and more preferably 1,000 to 45,000 from the viewpoints of mechanical strength of a molded product of a composition containing a modifier (K) according to the present invention and productivity of the (K).

The Mn is measured under the conditions below by GPC in the present invention.
Device: high-temperature gel permeation chromatography ["Alliance GPC V2000" manufactured By Waters Corporation]
Solvent: ortho-dichlorobenzene
Reference substance: polystyrene
Sample concentration: 3 mg/ml
Column stationary phase: PLgel 10 μm, MIXED-B two columns in series [manufactured by Polymer Laboratories Ltd.]
Column temperature: 135° C.

(A) has preferably a double bond in the molecule terminal and/or the polymer chain from the viewpoint of polymerization properties with an unsaturated dicarboxylic acid (anhydride) (B) or with (B) and an unsaturated aliphatic (C) mentioned later.

The number of double bonds of (A) in the molecule terminal and/or the polymer chain per 1,000 carbon atoms is preferably 0.1 to 20, more preferably 0.3 to 18, and particularly preferably 0.5 to 15, from the viewpoints of copolymerization properties of (A) with (B) or with (B) and (C) and productivity of (K). Herein, the number of double bonds can be calculated by an integrated value of the peak originating from double bonds at 4.5 to 6.0 ppm in the spectrum obtained by $^1$H-NMR (nuclear magnetic resonance) spectroscopy. The number of double bonds in Examples mentioned later is calculated in accordance with this method.

(A) has a solubility parameter (abbreviated as an SP value hereinbelow) of preferably 7.5 to 9 and more preferably 7.8 to 8.5 from the viewpoints of wettability for water and mechanical strength of a molded product mentioned later. Herein, the SP value refers to the amount defined by the below-described formula, provided that the energy density is expressed as ΔE (unit: cal/mol), and the molar volume is expressed as V (unit: cm$^3$/mol).
SP value=$(\Delta E/V)^{1/2}$ [unit: $(cal/cm^3)^{1/2}$]

As a specific method of determining the SP value, the Fedors method is known. This method is described in "A Method for Estimating both the Solubility Parameters and Molar Volumes of Liquids, POLYMER ENGINEERING AND SCIENCE, FEBRUARY, 1974, Vol. 14, Issue 2, p. 147-154" together with SP values obtained by this method. These can be used in the present invention, and SP values in Examples mentioned later are in accordance with this.

A method of producing (A) includes a polymerization method (e.g., one described in JP-A-59-206409) and a degradation method [thermal-, chemical-, and mechanical-type degradation methods etc.; of these, as the thermal-type degradation method (hereinbelow, this may be referred to as a thermal degradation method), e.g., those described in JP-B-43-9368, JP-B-44-29742, and JP-B-6-70094].

The polymerization method includes a method of (co)polymerizing one or two or more types of said olefins and a method of copolymerizing one or two or more types of the olefins with one or two or more types of other monomers.

The degradation method includes a method of thermally, chemically, or mechanically degrading a polyolefin (A0) having a high-molecular weight [Mn is preferably 30,000 to 400,000 and more preferably 50,000 to 200,000] and obtained by said polymerization method.

Of the degradation methods, the thermal degradation method includes (1) a method of thermally degrading said polyolefin (A0) under nitrogen aeration continuously for 0.5 to 10 hours at generally 300 to 450° C. in the absence of an organic peroxide, and (2) a method of thermally degrading said polyolefin (A0) under nitrogen aeration continuously for 0.5 to 10 hours at generally 100 to 300° C. in the presence of an organic peroxide.

Of these, preferred is the method (1) that is likely to produce (A) having a greater number of double bonds in the molecule terminal and/or the polymer chain, from the viewpoint of copolymerization properties of the obtained (A) with (B) or with (B) and (C).

Of these methods of producing (A), preferred is the degradation method, and more preferred is the thermal degradation method, from the viewpoints of ease of production of (A) having a greater number of double bonds in the molecule terminal and/or the polymer chain and ease of copolymerization of (A) with (B) or with (B) and (C).
[Unsaturated Dicarboxylic Acid (Anhydride) (B)]

An unsaturated dicarboxylic acid (anhydride) (B) in the present invention is a dicarboxylic acid (anhydride) having one polymerizable unsaturated group. It is to be noted that in the present invention the unsaturated dicarboxylic acid (anhydride) indicates an unsaturated dicarboxylic acid or an unsaturated dicarboxylic acid anhydride.

Examples of the (B) include those having a carbon number of 4 to 30, for example, aliphatic ones (a carbon number of 4 to 24, e.g., maleic acid, fumaric acid, itaconic acid, citraconic acid, mesaconic acid, and anhydrides of these) and alicyclic ones (a carbon number of 8 to 24, e.g., cyclohexane dicarboxylic acid and cycloheptene dicarboxylic acid). (B) may be used alone or two kinds thereof may be used in combination.

Of these, (B) is preferably an unsaturated dicarboxylic acid anhydride and more preferably maleic anhydride from the viewpoint of copolymerization properties with said (A) and an unsaturated aliphatic hydrocarbon (C) mentioned later.
[Unsaturated Aliphatic Hydrocarbon (C)]

An unsaturated aliphatic hydrocarbon (C) in the present invention includes an alkene having a carbon number of 2 to 30 which constitutes said (A), a linear α-olefin and a branched α-olefin having a carbon number of 6 to 36 (more preferably a carbon number of 8 to 30), as well as other unsaturated monomers having a carbon number of 4 to 30 and having copolymerization properties with an olefin (vinyl acetate, butadiene, etc.).

Examples of the above-described linear α-olefin include 1-hexene, 1-octene, 1-nonene, 1-decene, and a mixture of two or more kinds of these.

Examples of the branched α-olefin include a propylene trimer, a propylene tetramer, and a mixture of two or more kinds of these.

Of the above-described (C), preferred are a linear α-olefin and a branched α-olefin having a carbon number of 6 to 36 (more preferably a carbon number of 8 to 30) from the viewpoints of copolymerization properties with (A) and (B), mechanical strength of a polyolefin resin substrate, and an effect of imparting wettability of the obtained modifier (K).

As (C), preferred are those having an SP value of 7 to 9, and more preferred are those having an SR value of 7.5 to 8.5, from the viewpoints of wettability for water and mechanical strength of a molded product.
[Radical Initiator (D)]

A copolymer (X) in the present invention is obtained by copolymerizing said (A) and (B), or copolymerizing said (A), (B), and (C), in the presence of a radical initiator (D).

Examples of (D) include azo compounds (azobisisobutyronitrile, azobisisovaleronitrile, etc.) and peroxides [monofunctional peroxides (having one peroxide group in the molecule) (benzoyl peroxide, di-t-butyl peroxide, lauroyl peroxide, dicumyl peroxide, etc.) and multifunctional peroxides (having two or more peroxide groups in the molecule) [2,2-bis(4,4-di-t-butyl peroxy cyclohexyl)propane, di-t-butyl peroxy hexahydro terephthalate, diallyl peroxydicarbonate, etc.]].

Of these, preferred are peroxides, more preferred are monofunctional peroxides, and particularly preferred are di-t-butyl peroxide, lauroyl peroxide, and dicumyl peroxide, from the viewpoint of graft copolymerization properties of (A) and (B) or (A), (B), and (C), that is to say, the viewpoint of formation properties of a graft copolymer having (A) as a backbone and a (co)polymer of (B), or (B) and (C) as its side chain mentioned later.

The amount of (D) used is preferably 0.05 to 10%, more preferably 0.2 to 0.5%, and particularly preferably 0.5 to 3%, based on the total weight of (A) and (B) or the total weight of (A), (B), and (C), from the viewpoints of reactivity and suppression of side reaction.

[Copolymer (X)]

A copolymer (X) in the present invention has said polyolefin (A) and said unsaturated dicarboxylic acid (anhydride) (B) as a constitutional unit.

From the viewpoint of increasing the copolymerization rate of (B) so as to further improve wettability for water of the modifier (K), the unsaturated aliphatic hydrocarbon (C) may be added to the above-described constitutional unit, whereby (X) may be a copolymer having (A), (B), and (C) as a constitutional unit.

In producing (X), it is preferable that (X) does not contain styrene or a styrene derivative (those having a carbon number of 9 to 15, e.g., methylstyrene, α-methylstyrene, p-methoxystyrene, m-butylstyrene, etc.) as a constitutional unit or copolymerization from the viewpoint of wettability for water of a molded product mentioned later.

In (X), the ratio by weight of (A) and (B) [(A)/(B)] is preferably 0.5 to 150 and more preferably 0.8 to 100 from the viewpoints of mechanical strength and wettability for water of a molded product; the ratio by weight of (A) and (C) [(A)/(C)] is preferably 0.3 to 100 and more preferably 0.35 to 50 from the viewpoints of mechanical strength and wettability for water of a molded product; the ratio by weight of (A) and the total of (B) and (C) [(A)/[(B)+(C)]] is preferably 0.2 to 6 and more preferably 0.3 to 5 from the viewpoints of mechanical strength and wettability for water of a molded product; and the ratio by weight of (B) and (C) [(B)/(C)] is preferably 0.1 to 20 and more preferably 0.2 to 10 from the viewpoints of wettability for water and mechanical strength of a molded product.

As for the content of each component based on the total weight of (A), (B), and (C), (A) is preferably 20 to 85% and more preferably 30 to 80% from the viewpoints of productivity of the modifier (K) containing the copolymer (X) and improvement in wettability for water of a molded product; (B) is preferably 8 to 45% and more preferably 10 to 40% from the viewpoints of improvement in wettability for water of a molded product and productivity of (K); and (C) is generally 70% or less, and preferably 5 to 65% and more preferably 10 to 50% from the viewpoints of mechanical strength and improvement in wettability for water of a molded product.

The copolymer (X) can be produced by copolymerizing the polyolefin (A) and the unsaturated dicarboxylic acid (B) or copolymerizing (A), (B), and the unsaturated aliphatic hydrocarbon (C), in the presence of the radical initiator (D).

Specific methods of producing (X) include methods [1] and [2] below.

[1] A method comprising: suspending or dissolving (A) and (B) or (A), (B), and (C) in an appropriate, organic solvent [a carbon number of 3 to 18, e.g., hydrocarbons (hexane, heptane, octane, dodecane, benzene, toluene, xylene, etc.), halogenated hydrocarbons (di-, tri-, and tetra-chloroethane, dichlorobutane, etc.), ketones (acetone, methyl ethyl ketone, di-t-butyl ketone, etc.), ethers (ethyl-n-propyl ether, di-n-butyl ether, di-t-butyl ether, dioxane, etc.)]; if necessary, adding (D) [or a solution obtained by dissolving (D) in an appropriate organic solvent (the same as the above-described organic solvent)], and a chain transfer agent (t) and a polymerization inhibitor (f) mentioned later; and heating the mixture while stirring (solution method).

[2] A method comprising: mixing (A) and (B), or mixing (A), (B), and (C), and it necessary (D), (t), (f) in advance; and melt-kneading the mixture by using an extruder, Banbury mixer, kneader, or the like (melting method).

The reaction temperature in the solution method may be a temperature at which (A) is dissolved in an organic solvent, and it is preferably 50 to 220° C., more preferably 110 to 210° C., and particularly preferably 120 to 180° C., from the viewpoints of copolymerization properties of (A) and (B) or (A), (B) and (C) and productivity.

The reaction temperature in the melting method may be a temperature at which (A) is melted, and it is preferably 120 to 260° C. and more preferably 130 to 240° C. from the viewpoints of copolymerization properties of (A) and (B) or (A), (B) and (C) and decomposition temperature of a reaction product.

Examples of said chain transfer agent (t) include hydrocarbons [a carbon number of 6 to 24, e.g., aromatic hydrocarbons (toluene, xylene, ethyl benzene, isopropyl benzene, etc.)]; halogenated hydrocarbons (a carbon number of 1 to 24, e.g., dichloromethane, chloroform, carbon tetrachloride, and dichloroethane); alcohols (a carbon number of 1 to 24, e.g., methanol, ethanol, 1-propanol, 2-butanol, and allyl alcohol); thiols (a carbon number of 1 to 24, e.g., ethylthiol, propylthiol, 1- and 2-butylthiol, and 1-octylthiol); ketones (a carbon number of 3 to 24, e.g., acetone and methyl ethyl ketone); aldehydes (a carbon number of 2 to 18, e.g., 2-methyl-2-propylaldehyde, 1- and 2-butylaldehyde, and 1-pentylaldehyde); phenols (a carbon number of 6 to 36, e.g., phenol, o-, m-, and p-cresol); amines (a carbon number of 3 to 24, e.g., diethylmethylamine, triethylamine, and diphenylamine); and disulfides (a carbon number of 2 to 24, e.g., diethyldisulfide and di-1-propyldisulfide).

The amount of (t) used is generally 30% or less based on the total weight of (A) and (B) or the total weight of (A), (B), and (C), and preferably 0.1 to 20% from the viewpoints of copolymerization properties of (A) and (B) or (A), (B), and (C) and productivity.

Examples of said polymerization inhibitor (f) include catechols (a carbon number of 6 to 36, e.g., 2-methyl-2-propylcatechol), quinones (a carbon number of 6 to 24, e.g., p-benzoquinone), hydrazines (a carbon number of 2 to 36, e.g., 1,3,5-triphenylhydrazine), nitro compounds (a carbon number of 3 to 24, e.g., nitrobenzene), and stabilized radicals [a carbon number of 5 to 36, e.g., 1,1-diphenyl-2-picrylhydrazyl (DPPH), and 2,2,6,6-tetramethyl-1-piperidinyloxide (TEMPO)].

The amount of (f) used is generally 5% or less based on the total weight of (A) and (B) or the total weight of (A), (B), and (C), and preferably 0.01 to 0.5% from the viewpoints of productivity; stability of (A), (B), and (C); and reactivity of (A), (B), and (C).

The Mn of (X) is preferably 1,500 to 70,000, more preferably 2,000 to 60,000, and particularly preferably 2,500 to 50,000, from the viewpoints of mechanical strength and moldability of a molded product mentioned later (this may be simply referred to as a molded product hereinbelow).

(X) preferably has an SP value of 7.5 to 11, more preferably 8 to 10, from the viewpoints of wettability for water and mechanical strength of a molded product.

The acid value of (X) is 50 to 250 mg KOH/g (only numerical values are shown hereinbelow), and preferably 65 to 200 and particularly preferably 80 to 180 from the viewpoints of wettability of a molded product and compatibility between the modifier (K) and a polyolefin resin (E) mentioned later. If the acid value of (X) is less than 50, the wettability for water of a molded product deteriorates. If it is more than 250, the compatibility between the modifier (K) and a polyolefin resin (E) mentioned later deteriorates. Herein, the acid value is a value measured in accordance with JIS K0070. The acid values in Example mentioned later are in accordance with this method.

Examples of a method of adjusting the acid value of (X) within the above-described range include methods below.
(1) A method comprising: suspending or dissolving (A) and (B) in an appropriate organic solvent; and copolymerizing and (B) as a constitutional unit under the conditions of heating and stirring.
(2) A method comprising: further adding (C) to (A) and (B) as the constitutional unit; and copolymerizing them.

The above-described (1) can be carried out, specifically, by suspending or dissolving (A) and (B) in an appropriate organic solvent [a carbon number of 3 to 18, e.g., hydrocarbons (hexane, heptane, octane, decane, dodecane, benzene, toluene, xylene, etc.), halogenated hydrocarbons (di-, tri-, and tetra-chloroethane, dichlorobutane, etc.), ketones (acetone, methyl ethyl ketone, diethyl ketone, di-t-butyl ketone, etc.), ethers (ethyl-n-propyl ether, di-i-propyl ether, di-n-butyl ether, di-t-butyl ether, dioxane, etc.) etc.]; if necessary, adding (D) [or a solution obtained by dissolving (D) in an appropriate organic solvent (the same as the above-described organic solvent)], said chain transfer agent (t), and said polymerization inhibitor (f); and heating the mixture while stirring.

Of the above-described (1) and (2), (2) is a preferred method because the acid value of (X) can be adjusted within the above-described range by adding (C) as the constitutional unit to control the copolymerization rate of (B) easily.

The form of the copolymer (X) includes the followings.
[1] A graft copolymer having (A) as a backbone and a (co)polymer of (B), or (B) and (C) as its side chain.
[2] A random copolymer of (A) and (B) or (A), (B), and (C).

The above-described form [1] can be formed by, in the presence of (D), preferably a peroxide, heat-melting (A) and (B) or (A), (B), and (C), or suspending or dissolving (A) and (B) or (A), (B), and (C) in an appropriate organic solvent; if necessary, adding said chain transfer agent (t) and said polymerization inhibitor (f); and heating the mixture while stirring.

The above-described form [2] can be formed by, in the presence of (D), preferably an azo compound, heat-melting (A) and (B) or (A), (B), and (C), or suspending or dissolving (A) and (B) or (A), (B), and (C) in an appropriate organic solvent; if necessary, adding a chain transfer agent (t) and a polymerization inhibitor (f) mentioned later; and heating the mixture while stirring.

Of the forms [1] and [2], the form [1] is preferred from the viewpoint of imparting excellent wettability for water of a molded product mentioned later.
[Modifier for Polyolefin Resin (K)]

A modifier for polyolefin resin (K) of the present invention contains the copolymer (X) laving said polyolefin (A) and said unsaturated dicarboxylic acid (anhydride) (B) as a constitutional unit and having an acid value of 50 to 250 mg KOH/g.

The modifier (K) of the present invention is used as a modifier for a polyolefin resin (E) mentioned later.
[Polyolefin Resin Composition]

A polyolefin resin composition of the present invention contains said modifier (K) and a polyolefin resin (E).

(E) includes those obtained by the polymerization method and the degradation method (thermal-, chemical-, and mechanical-type degradation methods) of a polyolefin having a high-molecular weight (Mn is preferably 80,000 to 400,000) given as the examples of said method of producing (A), and examples thereof include said ethylene unit-containing (no propylene unit-containing) (co)polymer, said propylene unit-containing (no ethylene unit-containing) (co)polymer, said ethylene/propylene copolymer, and said (co)polymer of olefin(s) having a carbon number of 4 or more, given as the examples above.

As the combination of (E) and (K), it is preferred that the constitutional unit of (E) and the constitutional unit of the polyolefin (A) constituting (K) are the same or similar to each other, from the viewpoint of compatibility between (E) and (K). For example, in the case where (E) is a propylene unit-containing (no ethylene unit-containing) (co)polymer, it is preferred that (A) constituting (K) is also the propylene unit-containing (no ethylene unit-containing) (co)polymer.

The Mn of (E) is preferably 10,000 to 500,000 and more preferably 20,000 to 400,000 from the viewpoints of mechanical strength of a polyolefin resin substrate and compatibility with (K).

The polyolefin resin composition of the present invention may contain further various additives (G) if necessary, as long as the effect of the present invention is not impaired.

Examples of (G) include one or two or more kinds of additives selected from the group consisting of a colorant (G1), a flame retardant (G2), a filler (G3), a lubricant (G4), an antistatic agent (G5), a dispersant (G6), an antioxidant (G7), and an ultraviolet absorber (G8).

Examples of the colorant (G1) include a pigment and a dye.
Examples of the pigment include inorganic pigments (alumina white, graphite, etc.); and organic pigments (azo lake-based pigments etc.).

Examples of the dye include azo-based dyes and anthraquinone-based dyes.

Examples of the flame retardant (G2) include organic flame retardants [nitrogen-containing compounds [urea compounds, salts of guanidine compounds etc., etc.], sulfur-containing compounds [sulfate esters, sulfamic acid, and salts, esters, and amides of these, etc.], silicon-containing compounds [polyorganosiloxane, etc.], phosphorus-containing compounds [phosphate esters, etc.] etc.]; and inorganic flame retardants [antimony trioxide, magnesium hydroxide, aluminium hydroxide, ammonium polyphosphate, etc.].

Examples of the filler (G3) include carbonates (magnesium carbonate, calcium carbonate, etc.), sulfates (aluminium sulfate etc.), sulfites (calcium sulfite, etc.) metallic sulfides (molybdenum disulfide, etc.), silicates (aluminium silicate, etc.), diatomaceous earth, silica powder, talc, silica, zeolite, wood materials (wood powder, etc.), and a mixture of these.

Examples of the lubricant (G4) include waxes (carnauba wax, etc.), higher fatty acids (stearic acid, etc.), higher alcohols (stearyl alcohol, etc.), and higher fatty acid amides (stearic acid amide, etc.).

Examples of the antistatic agent (G5) include non-ionic, cationic, anionic, and amphoteric surfactants described below and in U.S. Pat. Nos. 3,929,678 and 4,331,447.

(1) Non-Ionic Surfactant

Alkylene oxide (abbreviated as an AO hereinbelow) adduct type nonionics, for example, (poly)oxyalkylene derivatives of active hydrogen atom-containing compounds having a hydrophobic group (a carbon number of 8 to 24 or more) [saturated and unsaturated, higher alcohols (a carbon number of 8 to 18), higher aliphatic amines (a carbon number of 8 to 24), higher fatty acids (a carbon number of 8 to 24) etc.], (AO adducts and higher fatty acid mono- and di-esters of polyalkylene glycol); (poly)oxyalkylene derivatives of higher fatty acid (a carbon number of 8 to 24) esters of polyhydric alcohols (a carbon number of 3 to 60) (Tween-type nonionics, etc.); (poly)oxyalkylene derivatives of higher fatty acid (as described above) (alkanol)amides; (poly)oxyalkylene derivatives of polyhydric alcohol (as described above) alkyl (a carbon number of 3 to 60) ethers; polyoxypropylene polyols [polyoxypropylene derivatives of polyhydric alcohols and polyamines (a carbon number of 2 to 10) (Pluronic type and Tetronic type nonionics)]; polyhydric alcohol (as described above) type nonionics (e.g., fatty acid esters of polyhydric alcohols, polyhydric alcohol alkyl (a carbon number of 3 to 60) ethers, and fatty acid alkanolamides); as well as amine oxide type nonionics [e.g., (hydroxyl)alkyl (a carbon number of 10 to 18) di(hydroxyl)alkyl (a carbon number of 1 to 3) amine oxides].

(2) Cationic Surfactant

Quaternary ammonium salt type cationics [tetraalkylammonium salts (a carbon number of 11 to 100), alkyl (a carbon number of 8 to 18) trimethylammonium salts, dialkyl (a carbon number of 8 to 18) dimethylammonium salts, etc.]; trialkylbenzylammonium salts (a carbon number of 17 to 80) (lauryldimethylbenzylammonium salts, etc.); alkyl (a carbon number of 8 to 60) pyridinium salts (cetylpyridinium salts, etc.); (poly)oxyalkylene (a carbon number of 2 to 4) trialkylammonium salts (a carbon number of 12 to 100) (polyoxyethylenelauryldimethylammonium salts, etc.); and acyl (a carbon number of 8 to 18) aminoalkyl (a carbon number of 2 to 4) or acyl (a carbon number of 8 to 18) oxyalkyl (a carbon number of 2 to 4) tri[(hydroxy)alkyl (a carbon number of 1 to 4)] ammonium salts (Sapamine type quaternary ammonium salts) [these salts include, for example, halides (chloride, bromide, etc.), alkyl sulfates (methosulfate, etc.) and salts with organic acids (as described below)]; and amine salt type cationics: salts of primary to tertiary amines [e.g., higher aliphatic amines (a carbon number of 12 to 60), polyoxyalkylene derivatives [ethylene oxide (abbreviated as EO hereinbelow) adducts, etc.] of aliphatic amines (methyl amine, diethyl amine, etc.), and acylaminoalkyl or acyloxyalkyl (as described above) di(hydroxyl)alkyl (as described above) amines (stearoyloxyethyldihydroxyethylamine, stearamidoethyldiethylamine, etc.)] with inorganic acids (hydrochloric acid, sulfuric acid, nitric acid, phosphoric acid, etc.) and organic acids (a carbon number of 2 to 22).

(3) Anionic Surfactant

Higher fatty acid (as described above) salts (sodium laurate, etc.), ethercarboxylic acids [carboxymethylation products of EO (1 to 10 mol) adducts], and salts of these; sulfate ester salts (alkyl and alkyl ether sulfates, etc.) sulfated oils, sulfated fatty acid esters, and sulfated olefins; sulfonic acid salts [alkylbenzenesulfonic acid salts, alkylnaphthalenesulfonic acid salts, dialkyl sulfosuccinate ester type, α-olefin (a carbon number of 12 to 18) sulfonic acid salts, N-acyl-N-methyltaurines (Igepon T type, etc.) etc.]; phosphate ester salts (alkyl, alkyl ether, alkylphenyl ether phosphates, etc.); and the like.

(4) Amphoteric Surfactant

Carboxylic acid (salt) type amphoterics [amino acid type amphoterics (laurylaminopropionic acids (salts), etc.), and betaine type amphoterics (alkyldimethylbetaines, alkyldihydroxyethylbetaines, etc.) etc.]; sulfate ester (salt) type amphoterics [laurylamine sulfate esters (salts), hydroxyethylimidazoline sulfate esters (salts), etc.]; sulfonic acid (salt) type amphoterics [pentadecylsulfotaurine, imidazolinesulfonic acid (salts), etc.]; phosphate ester (salt) type amphoterics [glycerol lauric acid ester phosphate esters (salts), etc.]; and the like.

The salts in the above described anionic and amphoteric surfactants include metal salts, for example, salts of alkali metal (lithium, sodium, potassium, etc. alkaline earth metal (calcium, magnesium, etc.), and group IIB metal (zinc, etc); ammonium salts; and amine salts and quaternary ammonium salts.

Examples of the dispersant (G6) include polymers having an Mn of 1,000 to 20,000, for example, vinyl resins (polyolefins (polyethylene, polypropylene, etc.), modified polyolefins [oxidized polyethylene (one obtained by oxidizing polyethylene with ozone or the like and introducing a carboxyl group, a carbonyl group, and/or a hydroxyl group, etc. thereinto) etc.], and vinyl resins other than the above-described polyolefins [polyhalogenated vinyls [polyvinyl chloride, polyvinyl bromide, etc.], polyvinyl acetate, polyvinyl alcohol, polymethylvinylether, poly(meth)acrylic acid, poly(meth)acrylic acid ester [poly methyl (meth)acrylate, etc.] and styrene resins [polystyrene, acrylonitrile/styrene (AS) resin, etc.], etc.]; polyester resins [polyethylene terephthalate, etc.], polyamide resins [6,6-nylon, 12-nylon, etc.], polyether resins [polyether sulfone, etc.], polycarbonate resins [a polycondensate of bisphenol A and phosgene, etc.], block copolymers of these, and the like.

Examples of the antioxidant (G7) include hindered phenol compounds [p-t-amyl phenol-formaldehyde resin, nordihydroguaiaretic acid (NDGA), 2,6-di-t-butyl-4-methyl phenol (BHT), 2-t-butyl-4-methyl phenol (BHA), 6-t-butyl-2,4,-methyl phenol (24M6B), 2,6-di-t-butyl phenol (26B), etc.];

sulfur-containing compounds [N,N-diphenylthiourea, dimyristylthiodipropionate, etc.]; and phosphorus-containing compounds [2-t-butyl-α-(3-t-butyl-4-hydroxyphenyl)-p-cumenylbis(p-nonylphenyl)phosphite, dioctadecyl-4-hydroxy-3,5-di-t-butylbenzylphosphonate, etc.].

Examples of the ultraviolet absorber (G8) include salicylate compounds [phenyl salicylate, etc.]; benzophenone compounds [2,4-dihydroxybenzophenone, etc.]; and benzotriazole compounds [2-(2'-hydroxy-5'-methylphenyl) benzotriazole, etc.].

The content of whole (G) [except for the wood material in (G3)] in the polyolefin resin composition is generally 20% or less based on the total weight of the composition, and preferably 0.05 to 10% and more preferably 0.1 to 5% from the viewpoints of functional expression of each (G) and industrial demands. The content of whole (G) in the case of including (G3) in the polyolefin resin composition is generally 85% or less based on the total weight of the composition, and preferably 0.05 to 80% and more preferably 0.1 to 75% from the viewpoints of functional expression of each (G) and industrial demands.

As for the amount of each additive used based on the total weight of the composition, (G1) is generally 5% or less and preferably 0.1 to 3%; (G2) is generally 8% or less and preferably 1 to 3%; (G3) except for the wood material is generally 5% or less and preferably 0.1 to 1%; the wood material in (G3) is generally 85% or less and preferably 5 to 80%; (G4) is generally 8% or less and preferably 1 to 5%; (G5) is generally 8% or less and preferably 1 to 3%; (G6) is generally 1% or less and preferably 0.1 to 0.5%; (G7) is generally 2% or less and preferably 0.05 to 0.5%; and (G8) is generally 2% or less and preferably 0.05 to 0.5%.

In the case where additives are the same and overlap among the above-described (G1) to (G8), each additive is not be used in an amount that exhibits the corresponding addition effect as it is, but the amount used is adjusted according to the intended use with consideration that the effect as other additive is also attained at the same time.

Examples of a method of producing the polyolefin resin composition of the present invention include:
(1) a method of mixing said (E) and (K), and if necessary (G) at one operation to provide a polyolefin resin composition (one operation method); and
(2) a method of mixing a part of (E) and the whole content of (K), and if necessary a part or the whole content of (G) to produce a master batch polyolefin resin composition containing a high concentration of (K) once, and then adding and mixing the remains of (E) and if necessary the remains of (G) to provide a polyolefin resin composition (master batch method).

Preferred is the method (2) from the viewpoint of mixing efficiency of (K).

The ratio by weight of (K) and (E) in the polyolefin resin composition of the present invention is preferably 0.1/99.9 to 50/50, more preferably 10/90 to 40/60, particularly preferably 15/85 to 35/65, and most preferably 20/80 to 30/70, from the viewpoints of wettability for water and mechanical strength of a molded product mentioned later.

Specific examples of the mixing method in said method of producing the polyolefin resin composition include:
(i) a method of mixing respective components to be mixed by, for example, a powder mixer ["Henschel mixer" [trade name "Henschel mixer FM150L/B" manufactured by Mitsui Mining Co., Ltd.], "Nauta Mixer" [trade name "Nauta Mixer DBX3000RX" manufactured by Hosokawa Micron Group], or "Banbury mixer" [trade name "MIXTRON BB-16MIXER" manufactured by Kobe Steel, Ltd." etc.] etc.] and kneading the mixture by using a melt-kneader [batch kneader, continuous kneader (uniaxial kneader, biaxial kneader), etc.] at usually 120 to 220° C. for 2 to 30 minutes; and
(ii) a method of directly kneading respective components to be mixed by using the same melt-kneader under the same conditions as described above, without powder-mixing respective components to be mixed in advance.

Of these, the method (i) is preferred from the viewpoint of mixing efficiency.

The modifier (K) of the present invention or the polyolefin resin composition containing this modifier (K) is also characterized by having an excellent affinity with both low-polarity plastics such as polyolefin and high-polarity plastics such as polyurethane, since (K) has said carboxyl group and the like.

Accordingly, for adherence between plastics having different polarities (in the case where one is a substrate and the other is a coating material, etc.), the modifier (K) of the present invention or the polyolefin resin composition containing this modifier (K) can be applied as a primer for a plastic molded product and the like.

[Molded Product and Molded Article]

A molded product of the present invention is obtained by molding said polyolefin resin composition.

Examples of a molding method include injection molding, compression molding, calendar molding, slush molding, rotational molding, extrusion molding, blow molding, and film molding (a casting method, a tenter method, an inflation method, etc.). The molded product can be molded by any method in which means such as single-layer molding, multi-layer molding, and foam molding is also incorporated according to its purpose. Examples of the form of the molded product include plate-like, sheet-like, film, and fiber (including non-woven fabric etc.).

The molded product of the present invention contains the modifier (K) having said carboxyl group and the like, and therefore is excellent in wettability for water and affinity with a coating material, ink, and the like which have a relatively high polarity as mentioned later.

The molded product of the present invention has excellent mechanical strength and good coating and printing properties, and a molded article is obtained by subjecting the molded product to coating and/or printing.

Examples of a method of coating the molded product include, but not limited to, air spray coating, airless spray coating, electrostatic spray coating, dip coating, roller coating, and brush coating.

Examples of the coating material include those commonly used in coating plastics, such as a polyester melamine resin coating material, an epoxy melamine resin coating material, an acrylic melamine resin coating material, and an acrylic urethane resin coating material. These coating materials, what is called coating materials having a relatively high polarity, can be used. Also, low-polarity coating materials (olefin-based ones, etc.) can be used.

The film thickness of coating (dry film thickness) can be selected according to its purpose, but usually 10 to 50 μm.

As a method of further printing the molded product or the molded product after coating, any printing method commonly used in coating plastics can be used, and examples thereof include gravure printing, flexo printing, screen printing, pad printing, dry offset printing, and offset printing.

As a printing ink, those usually used in printing plastics, such as gravure ink, flexo ink, screen ink, pad ink, dry offset ink, and offset ink can be used.

Of the molded product and the molded article of the present invention, examples of those using a wood material as said filler (G3) include a composite material of a wood material and a plastic, what is called a wood plastic (a wood/plastic composite material). Conventionally, the wood plastic has the problems of insufficient affinity between the plastic and the wood material and poor mechanical strength such as impact resistance. However, the molded product and the molded article obtained by molding the polyolefin resin composition of the present invention in the case of containing the wood material therein are also excellent in mechanical strength such as impact resistance as a wood plastic. The reason is assumed that, since the resin composition contains the modifier (K) that has a great number of carboxyl groups and the like of the present invention, the affinity with a wood material having a great number of OH groups, so to say having high polarity, is increased.

EXAMPLES

Hereinafter, the present invention will be further described by way of examples; however, the present invention is not limited to these. In the following examples, "part(s)" represents part(s) by weight and "%" except for "mol %" represents % by weight.

Polyolefin

Production Example 1

In a reaction vessel were charged 100 parts of a polyolefin (P1) consisting of 98 mol % of propylene and 2 mol % of ethylene [trade name "SunAllomer PZA20A", product of SunAllomer Ltd., Mn 100,000, hereinafter the same shall apply] under nitrogen atmosphere. While aerating nitrogen through the gas phase portion, the content was heated to melt using a mantle heater, and thermally degraded at 360° C. for 70 minutes with stirring to obtain a thermally degraded material (A-1). The (A-1) had an SP value of 8.1, a number of double bonds in the molecule terminal and/or the polymer chain per 1,000 carbon atoms of 7.2 and an Mn of 3,000.

Production Example 2

The same procedure as in Production Example 1 was performed with the exception that the thermally degradation time was changed to 100 minutes instead of 70 minutes in Production Example 1 to obtain a thermally degraded material (A-2). The (A-2) had an SP value of 8.1, a number of double bonds in the molecule terminal and/or the polymer chain per 1,000 carbon atoms of 18 and an Mn of 1,200.

Production Example 3

The same procedure as in Production Example 1 was performed with the exception that the thermally degradation time was changed to 20 minutes instead of 70 minutes in Production Example 1 to obtain a thermally degraded material (A-3). The (A-3) had an SP value of 8.1, a number of double bonds in the molecule terminal and/or the polymer chain per 1,000 carbon atoms of 0.3 and an Mn of 45,000.

Production Example 4

The same procedure as in Production Example 1 was performed with the exception that 100 parts of a polyolefin (P2) consisting of 80 mol % of propylene and 20 mol % of 1-butane [trade name "TAFMER XM-5080", product of Mitsui Chemical Co., Ltd., Mn 90,000, hereinafter the same shall apply] was used in place of 100 parts of the polyolefin (P1) in Production Example 1, to obtain a thermally degraded material (A-4). The (A-4) had an SP value of 8.2, a number of double bonds in the molecule terminal and/or the polymer chain per 1,000 carbon atoms of 7.2 and an Mn of 3,000.

Production Example 5

The same procedure as in Production Example 1 was performed with the exception that the thermally degradation time was changed to 120 minutes instead of 70 minutes in Production Example 1 to obtain a thermally degraded material. (A-5). The (A-5) had an SP value of 8.1, a number of double bonds in the molecule terminal and/or the polymer chain per 1,000 carbon atoms of 36 and an Mn of 600.

Production Example 6

The same procedure as in Production Example 1 was performed with the exception that the thermally degradation time was changed to 10 minutes instead of 70 minutes in Production Example 1 to obtain a thermally degraded material (A-6). The (A-6) had an SP value of 8.1, a number of double bonds in the molecule terminal and/or the polymer chain per 1,000 carbon atoms of 0.05 and an Mn of 65,000.

Modifier for Polyolefin Resin

Example 1

Into a reaction vessel were charged 100 parts of (A-1), 24 parts of maleic anhydride, 18.5 parts of 1-decene (C-1) (SP value: 7.8) and 100 parts of xylene. After substitution with nitrogen, the mixture was uniformly dissolved by heating to 130° C. under nitrogen aeration. Thereto was added dropwise a solution prepared by dissolving 0.5 parts of dicumyl peroxide [trade name "PERCUMYL D", product of NOF CORPORATION] (D-1) in 10 parts of xylene in 10 minutes, then stirring was maintained for 3 hours under xylene refluxing. Thereafter, xylene and unreacted maleic anhydride was distilled off under a reduced pressure (1.5 kPa, hereinafter the same shall apply) to obtain a modifier for pal olefin resin (K-1) containing a copolymer (X-1). The (X-1) had an SP value of 8.8, an acid value of 95 and an Mn of 5,000.

Example 2

The same procedure as in Example 1 was performed with the exception that 100 parts of (A-2), 100 parts of maleic anhydride and 85.7 parts of (C-1) were used in place of 100 parts of (A-1), 24 parts of maleic anhydride and 18.5 parts of (C-1) in Example 1, to obtain a modifier for polyolefin resin (K-2) containing a copolymer (X-2). The (X-2) had an SP value of 9.5, an acid value of 200 and an Mn of 4,000.

Example 3

The same procedure as in Example 1 was performed with the exception that 32.7 parts of maleic anhydride and 23.6 parts of (C-1) were used in place of 24 parts of maleic anhydride and 18.5 parts of (C-1) in Example 1, to obtain a modifier for polyolefin resin (K-3) containing a copolymer (X-3). The (X-3) had an SP value of 9, an acid value of 120 and an Mn of 5,000.

Example 4

The same procedure as in Example 1 was performed with the exception that 100 parts of (A-4) was used in place of 100 parts of (A-1) in Example 1, to obtain a modifier for polyolefin resin (K-4) containing a copolymer (X-4). The (X-4) had an SP value of 8.9, an acid value of 95 and an Mn of 5,000.

Example 5

The same procedure as in Example 1 was performed with the exception that 100 parts of (A-2), 116.8 parts of maleic anhydride and 50.5 parts of 1-hexene (C-2) (SP value: 7.5) were used in place of 100 parts of (A-1), 24 parts of maleic: anhydride and 18.5 parts of 1-decene (C-1) in Example 1, to obtain a modifier for polyolefin resin. (K-5) containing a copolymer (X-5). The (X-5) had an SP value of 9.9, an acid value of 250 and an Mn of 2,500.

Example 6

The same procedure as in Example 1 was performed with the exception that 3.8 parts of (C-2) were used in place of 18.5 parts of (C-1) in Example 1, to obtain a modifier for polyolefin resin (K-6) containing a copolymer (X-6). The (X-6) had an SP value of 8.5, an acid value of 108 and an Mn of 4,800.

Example 7

The same procedure as in Example 1 was performed with the exception that 33 parts of maleic anhydride and 200 parts of 1-hexatriacontene (α-olefin of C36) (C-3) (SP value: 8.3) were used in place of 24 parts of maleic anhydride and 18.5 parts of (C-1) in Example 1, to obtain a modifier for polyolefin resin (K-7) containing a copolymer (X-7). The (X-7) had an SP value of 8.6, an acid value of 57 and an Mn of 7,000.

Example 8

The same procedure as in Example 1 was performed with the exception that 100 parts of (A-2), 19 parts of maleic anhydride were used and (C-1) was not used in place of 100 parts of (A-1), 24 parts of maleic anhydride and 18.5 parts of 1-decene (C-1) in Example 1, to obtain a modifier for polyolefin resin (K-8) containing a copolymer (X-8). The (X-8) had an SP value of 8.8, an acid value of 91.5 and an Mn of 1,600.

Example 9

The same procedure as in Example 1 was performed with the exception that 25 parts of maleic anhydride, 18 parts of (C-1) and 0.5 part of 1,1'-azobis(cyclonexane-1-carbonitrile) [trade name "V-40", product of Wako Pure Chemical Industries, Ltd.] (D-2) were used in place of 24 parts of maleic anhydride, 18.5 parts of 1-decene (C-1) and 0.5 part of (D-1) in Example 1, to obtain a modifier for polyolefin resin (K-9) containing a copolymer (X-9). The (X-9) had an SP value of 8.8, an acid value of 100 and an Mn of 4,500.

Example 10

The same procedure as in Example 1 was performed with the exception that 100 parts of (A-3), 13.4 parts of maleic anhydride and 8.5 parts of (C-2) were used in place of 100 parts of (A-1), 24 parts of maleic anhydride and 18.5 parts of 1-decene (C-1) in Example 1, to obtain a modifier for polyolefin resin (K-10) containing a copolymer (X-10). The (X-10) had an SP value of 8.6, an acid value of 65 and an Mn of 50,000

Example 11

The same procedure as in Example 1 was performed with the exception that 100 parts of (A-2), 18.2 parts of maleic anhydride and 11.6 parts of (C-2) were used in place of 100 parts of (A-1), 24 parts of maleic anhydride and 18.5 parts of 1-decene (C-1) in Example 1, to obtain a modifier for polyolefin resin (K-11) containing a copolymer (X-11). The (X-11) had an SP value of 8.7, an acid value of 80 and an Mn of 2,200.

Comparative Example 1

The same procedure as in Example 1 was performed with the exception that 100 parts of (A-6), 7.8 parts of maleic anhydride and 3.3 parts of 1-pentacontene (α-olefin of C50) (C-4) (SP value: 8.4) were used in place of 100 parts of (A-1), 24 parts of maleic anhydride and 18.5 parts of (C-1) in Example 1, to obtain a modifier for polyolefin resin (RK-1) containing a copolymer (RX-1). The (RX-1) had an SP value of 8.4, an acid value of 40 and an Mn of 75,000.

Comparative Example 2

The same procedure as in Example 1 was performed with the exception that 100 parts of (A-5), 146.1 parts of maleic anhydride and 63.5 parts of 1-butene (C-5) (SP value: 7.1) were used in place of 100 parts of (A-1), 24 parts of maleic anhydride and 18.5 parts of (C-1) in Example 1, to obtain a modifier for polyolefin resin (RK-2) containing a copolymer (RX-2). The (RX-2) had an SP value of 10, an acid value of 270 and an Mn of 1,100.

Comparative Example 3

The same procedure as in Example 1 was performed with the exception that 100 parts of (A-6), 5.5 parts of maleic anhydride and 5.5 parts of (C-1) were used in place of 100 parts of (A-1), 24 parts of maleic anhydride, and 18.5 parts of (C-1) in Example 1, to obtain a modifier for polyolefin resin (RK-3) containing a copolymer (RX-3). The (RX-3) had an SP value of 8.3, an acid value of 28 and an Mn of 67,000.

Resin Composition and Molded Product

Examples 12 to 24 and Comparative Examples 4 to 12

(K-1) to (K-11), (RK-1) to (RK-3), a commercially available low-molecular weight modifier (RK-4) [an aliphatic ester-based non-ionic surfactant, trade name "Chemistat 1100" manufactured by Sanyo Chemical Industries, Ltd.], said thermal degradation product (A-1), a commercially available polypropylene (E-1) [trade name "SunAllomer PL500A" manufactured by SunAllomer Ltd.], a commercially available polyethylene (E-2) [trade name "Novatec HJ490" manufactured by Japan Polyethylene Corporation, Mn 300,000], and a commercially available ethylene/propylene copolymer (E-3) [trade name "SunAllomer PB222A" manufactured by SunAllomer Ltd., Mn 350,000] were blended in accordance with the formulation composition (part) in Table 1. Each mixture was blended for 3 minutes by a Henschel mixer, and melt-kneaded by a vented-biaxial extruder under the conditions of 180° C., 100 rpm, and a retention time of 5 minutes to obtain a polyolefin resin composition.

Each resin composition was molded by using an injection molding machine [trade name "PS40E5ASE" manufactured by Nissei Plastic Industrial Co., Ltd.] at a cylinder temperature of 240° C. and a mold temperature of 60° C. to produce a predetermined test piece. Each test piece was then evaluated according to the evaluation method mentioned later. The results are shown in Table 1.

Primer

Examples 25 to 30 and Comparative Examples 13 to 16

In accordance with the formulation composition (part) in Table 2, the modifiers and the resin compositions obtained in the same manner as said method were dissolved in xylene to give primer solutions (solid content concentration 20%). Each primer solution was spray-coated on the surface of a polyolefin resin substrate [trade name "PP1300", polypropylene, manufactured by Takiron Co., Ltd.] by using a sprayer [trade name "EBG-115EXB" manufactured by Anest Iwata Corporation] and dried at 80° C. for 10 minutes (film thickness after drying: 80 μm). Then, a polyurethane coating material [trade name "UCOAT UX-150" manufactured by Sanyo Chemical Industries, Ltd.] was spray-coated thereon by using the same sprayer and dried at 80° C. for 10 minutes (film thickness of the urethane coating material after drying: 100 μm). The coated surface was subjected to a bonding property test by the grid tape method in conformity to JIS K5400. Per the number of grids of 100, the number of parts where no coating film was peeled is represented by 0 to 100. The larger the number is, the better the adherence property between the substrate and the coating film is. The results are shown in Table 2.

Wood Plastic

Examples 31 to 45 and Comparative Examples 17 to 23

Said-obtained modifiers, said polyolefin resins (E1) to (E3), and the below-described raw material used [wood material (G3)] were blended in accordance with the formulation composition (part) in Table 3. Each mixture was blended for 3 minutes by a Henschel mixer, and melt-kneaded by a vented-biaxial extruder under the conditions of 180° C., 100 rpm, and a retention time of 5 minutes to obtain a wood material-containing resin composition. Each resin composition was molded by using an injection molding machine [trade name "PS40E5ASE" manufactured by Nissei Plastic Industrial Co., Ltd.] at a cylinder temperature of 190° C. and a mold temperature of 60° C. to produce a predetermined wood plastic test piece. Each test piece was then evaluated according to the evaluation method mentioned later. The result are shown in Table 3.

<Raw Material Used>
Wood Material (G3)
  (G3-1): wood powder [trade name "Sellyunt" manufactured by Shimada & Co., Ltd., volume average particle diameter 80 μm]
  (G3-2): wood powder [trade name "Superfeeder #100" manufactured by Sankyo Seifun Co., Ltd., volume average particle diameter 150 μm]

<Evaluation Method>
1. Impact resistance (unit: J/m)
   The Izod impact value was measured in conformity to ASTM D256.
2. Impact resistance (unit: kJ/m$^2$)
   The Charpy impact value was measured in conformity to ASTM D6110.
3. Tensile elastic modulus (unit: MPa)
   The tensile elastic modulus was measured in conformity to JIS K7161.
4. Bending elastic modulus (unit: MPa)
   The bending elastic modulus was measured in conformity to ASTM D790.
5. Wettability (unit: mN/m)
   The wetting tension was measured in conformity to JIS K6768. This shows that, as the wetting tension becomes larger, the wettability becomes better.
6. Durability of wettability (unit: mN/m)
   The test pieces were each left to stand in an air circulation constant-temperature device adjusted to 50° C. [trade name "DN410H" manufactured by Yamato Scientific Co., Ltd.] for 30 days. The wetting tension thereof was then measured in the same manner as in the above-described 3.

TABLE 1

| | | Example | | | | | | | | | | |
|---|---|---|---|---|---|---|---|---|---|---|---|---|
| | | 12 | 13 | 14 | 15 | 16 | 17 | 18 | 19 | 20 | 21 | 22 |
| Formulation composition (part) | K-1 | 20 | | | | | | | | | | |
| | K-2 | | 20 | | | | | | | | | |
| | K-3 | | | 20 | | | | | | | | |
| | K-4 | | | | 20 | | | | | | | |
| | K-5 | | | | | | | | | | | 50 |
| | K-6 | | | | | 20 | | | | | | |
| | K-7 | | | | | | 20 | | | | | |
| | K-8 | | | | | | | 20 | | | | |
| | K-9 | | | | | | | | 20 | | | |
| | K-10 | | | | | | | | | 20 | | |
| | K-11 | | | | | | | | | | 20 | |
| | RK-1 | | | | | | | | | | | |
| | RK-2 | | | | | | | | | | | |
| | RK-3 | | | | | | | | | | | |
| | RK-4 | | | | | | | | | | | |
| | A-1 | | | | | | | | | | | |
| | E-1 | 80 | 80 | 80 | | 80 | | | | | | |
| | E-2 | | | | 80 | | | 80 | 80 | 80 | 80 | |
| | E-3 | | | | | | 80 | | | | | 50 |
| Evaluation result | Impact resistance (J/m) | 33 | 32 | 33 | 17 | 33 | 56 | 17 | 18 | 17 | 17 | 50 |
| | Tensile elastic modulus (MPa) | 1200 | 1200 | 1200 | 850 | 1200 | 900 | 850 | 900 | 860 | 870 | 900 |
| | Wettability (mN/m) | 34 | 35 | 35 | 33 | 34 | 33 | 35 | 35 | 33 | 34 | 41 |
| | Durability of wettability (mN/m) | 34 | 35 | 35 | 33 | 34 | 33 | 35 | 35 | 33 | 34 | 41 |

TABLE 1-continued

|  |  | Example | | Comparative Example | | | | | | | | |
|---|---|---|---|---|---|---|---|---|---|---|---|---|
|  |  | 23 | 24 | 4 | 5 | 6 | 7 | 8 | 9 | 10 | 11 | 12 |
| Formulation composition (part) | K-1 |  |  |  |  |  | 100 |  |  |  |  |  |
|  | K-2 |  | 10 |  |  |  |  |  |  |  |  |  |
|  | K-3 |  |  |  |  |  |  |  |  |  |  |  |
|  | K-4 |  |  |  |  |  |  |  |  |  |  |  |
|  | K-5 | 1 |  |  |  |  |  |  |  |  |  |  |
|  | K-6 |  |  |  |  |  |  |  |  |  |  |  |
|  | K-7 |  |  |  |  |  |  |  |  |  |  |  |
|  | K-8 |  |  |  |  |  |  |  |  |  |  |  |
|  | K-9 |  |  |  |  |  |  |  |  |  |  |  |
|  | K-10 |  |  |  |  |  |  |  |  |  |  |  |
|  | K-11 |  |  |  |  |  |  |  |  |  |  |  |
|  | RK-1 |  |  |  |  |  |  |  | 20 |  |  |  |
|  | RK-2 |  |  |  |  |  |  |  |  | 20 |  |  |
|  | RK-3 |  |  |  |  |  |  |  |  |  | 20 |  |
|  | RK-4 |  |  |  |  |  |  |  |  |  |  | 20 |
|  | A-1 |  |  |  |  |  |  |  |  |  |  | 20 |
|  | E-1 |  | 90 | 100 |  |  |  |  |  | 80 | 80 | 80 |
|  | E-2 |  |  |  | 100 |  |  | 80 |  |  |  |  |
|  | E-3 | 99 |  |  |  | 100 |  |  | 80 |  |  |  |
| Evaluation result | Impact resistance (J/m) | 58 | 33 | 34 | 18 | 58 | 20 | 16 | 48 | 34 | 25 | 33 |
|  | Tensile elastic modulus (MPa) | 950 | 1300 | 1300 | 900 | 950 | 400 | 900 | 700 | 1250 | 800 | 1200 |
|  | Wettability (mN/m) | 33 | 34 | 30 | 30 | 30 | 38 | 31 | 37 | 30 | 45 | 30 |
|  | Durability of wettability (mN/m) | 33 | 34 | 30 | 30 | 30 | 38 | 31 | 37 | 30 | 32 | 30 |

TABLE 2

|  |  | Example | | | | | | Comparative Example | | | |
|---|---|---|---|---|---|---|---|---|---|---|---|
|  |  | 25 | 26 | 27 | 28 | 29 | 30 | 13 | 14 | 15 | 16 |
| Formulation composition (part) | K-3 | 100 |  |  | 50 |  |  |  |  |  |  |
|  | K-5 |  | 100 |  |  | 50 |  |  |  |  |  |
|  | K-7 |  |  | 100 |  |  | 50 |  |  |  |  |
|  | RK-1 |  |  |  |  |  |  | 100 |  | 50 |  |
|  | RK-3 |  |  |  |  |  |  |  | 100 |  | 50 |
|  | E-1 |  |  |  | 50 | 50 | 50 |  |  | 50 | 50 |
| Evaluation result | Grid test | 98 | 100 | 99 | 97 | 100 | 97 | 90 | 87 | 85 | 83 |

TABLE 3

|  |  | Example | | | | | | | | | | |
|---|---|---|---|---|---|---|---|---|---|---|---|---|
|  |  | 31 | 32 | 33 | 34 | 35 | 36 | 37 | 38 | 39 | 40 | 41 |
| Formulation composition (part) | K-1 | 2 |  |  |  |  |  |  |  |  |  |  |
|  | K-2 |  | 2 |  |  |  |  |  |  |  |  |  |
|  | K-3 |  |  | 2 |  |  |  |  |  |  |  |  |
|  | K-4 |  |  |  | 2 |  |  |  |  |  |  |  |
|  | K-5 |  |  |  |  | 2 |  |  |  |  |  |  |
|  | K-6 |  |  |  |  |  | 2 |  |  |  |  |  |
|  | K-7 |  |  |  |  |  |  | 2 |  |  |  |  |
|  | K-8 |  |  |  |  |  |  |  | 2 |  |  |  |
|  | K-9 |  |  |  |  |  |  |  |  | 2 |  |  |
|  | K-10 |  |  |  |  |  |  |  |  |  | 2 |  |
|  | K-11 |  |  |  |  |  |  |  |  |  |  | 2 |
|  | RK-1 |  |  |  |  |  |  |  |  |  |  |  |
|  | RK-2 |  |  |  |  |  |  |  |  |  |  |  |
|  | RK-3 |  |  |  |  |  |  |  |  |  |  |  |

TABLE 3-continued

|  |  | | | | | | | | | | |
|---|---|---|---|---|---|---|---|---|---|---|---|
|  | E-1 | 48 |  | 48 |  | 48 | 48 |  |  | 48 |  |
|  | E-2 |  | 48 |  |  |  |  | 48 |  | 48 |  | 48 |
|  | E-3 |  |  |  | 48 |  |  |  | 48 |  |  |
|  | G3-1 | 50 | 50 |  | 50 |  | 50 |  | 50 | 50 | 50 | 50 |
|  | G3-2 |  |  | 50 |  | 50 |  | 50 |  |  |  |
| Evaluation result | Impact resistance (kJ/m²) | 2.3 | 1.7 | 2.5 | 8.5 | 3.6 | 2.6 | 1.5 | 7.9 | 1.9 | 2.5 | 1.6 |
|  | Bending elastic modulus (MPa) | 3600 | 2300 | 3500 | 1800 | 3800 | 3700 | 2100 | 1700 | 2200 | 3500 | 2200 |

|  |  |  | Example | | | | Comparative Example | | | | | | |
|---|---|---|---|---|---|---|---|---|---|---|---|---|---|
|  |  |  | 42 | 43 | 44 | 45 | 17 | 18 | 19 | 20 | 21 | 22 | 23 |
| Formulation composition (part) | K-1 | | 2 | 2 | 0.5 | 15 | | | | | | | |
|  | K-2 | | | | | | | | | | | | |
|  | K-3 | | | | | | | | | | | | |
|  | K-4 | | | | | | | | | | | | |
|  | K-5 | | | | | | | | | | | | |
|  | K-6 | | | | | | | | | | | | |
|  | K-7 | | | | | | | | | | | | |
|  | K-8 | | | | | | | | | | | | |
|  | K-9 | | | | | | | | | | | | |
|  | K-10 | | | | | | | | | | | | |
|  | K-11 | | | | | | | | | | | | |
|  | RK-1 | | | | | | | | | | 2 | | |
|  | RK-2 | | | | | | | | | | | 2 | |
|  | RK-3 | | | | | | | | | | | | 2 |
|  | E-1 | | 10 | 85 | 49.5 | 40 | 100 | | | 50 | 48 | | 10 |
|  | E-2 | | | | | | | 100 | | | | 48 | |
|  | E-3 | | | | | | | | 100 | | | | |
|  | G3-1 | | 88 | 13 | 50 | 45 | | | | 50 | 50 | | 88 |
|  | G3-2 | | | | | | | | | | | 50 | |
| Evaluation result | Impact resistance (kJ/m²) | | 1.5 | 4.9 | 2.5 | 3.5 | 5.7 | 3.0 | 13.0 | 0.9 | 1.3 | 1.8 | 1.3 |
|  | Bending elastic modulus (MPa) | | 700 | 1800 | 3100 | 3800 | 1500 | 1000 | 600 | 1800 | 2300 | 200 | 150 |

The results of Table 1 show that the polyolefin resin compositions of the present invention are excellent in moldability, and the molded products obtained by molding the compositions are excellent in both mechanical strength and wettability compared with conventional ones.

The results of Table 2 show that the primers made of the polyolefin resin compositions of the present invention are significantly excellent in adherence property between plastics having different polarities (polyolefin resin and polyurethane resin, etc.) compared with conventional ones.

The results of Table 3 show that the wood plastics of the present invention are excellent in both bending elastic modulus and impact resistance and significantly good in affinity between the plastic and the wood material compared with conventional ones.

INDUSTRIAL APPLICABILITY

The modifier for polyolefin resin (K) of the present invention is excellent in imparting wettability for water to the molded product and imparting affinity with other resins having different polarities without decreasing the mechanical strength of the molded product. The molded product obtained by molding the polyolefin resin composition containing the modifier (K) is excellent in wettability for water and in the balance between affinity with other resins having different polarities and the mechanical strength. Therefore, the modifier (K) can be applied as a modifier for polyolefin resin, the resin composition containing (K) can be applied as a primer for a plastic molded product, and the molded product and the molded article obtained by molding the composition can be applied as a wood plastic and the like, in a wide variety of fields such as for electrical/electronic devices, packaging materials, delivery materials, materials for household goods, and building materials.

Since the molded product of the present invention contains the modifier having a great number of carboxyl groups and the like, it has an excellent capturing property of ammonium ions, metal ions, and the like, so that it can be applied in a wide variety of fields such as intended uses where such a property is expected (a battery separator, etc.) and is highly useful.

The invention claimed is:

1. A modifier for polyolefin resin (K) containing a copolymer (X) having a polyolefin (A), an unsaturated dicarboxylic acid (anhydride) (B) and an unsaturated aliphatic hydrocarbon (C) as a constitutional unit and having an acid value of 50 to 250 mg KOH/g,
    wherein said (C) is a linear α-olefin or a branched α-olefin having a carbon number of 6 to 36, and
    wherein said (X) is a graft copolymer having said (A) as a backbone and a (co)polymer of said (B) and said (C) as its side chain.

2. The modifier according to claim 1, wherein (A), (B), and (C) are copolymerized, in the presence of a radical initiator (D).

3. The modifier according to claim 1, wherein (X) does not contain styrene or a styrene derivative as the constitutional unit.

4. The modifier according to claim 1, wherein the content of (A) is 20 to 85%, the content of (B) is 8 to 45%, and the content of (C) is 5 to 65%, based on the total weight of (A), (B), and (C).

5. The modifier according to claim 2, wherein the amount of (D) used is 0.05 to 10% based on the total weight of (A), (B), and (C).

6. A polyolefin resin composition containing the modifier (K) according to claim 1 and a polyolefin resin (E).

7. The composition according to claim 6, wherein the ratio by weight of (K) and (E) is 0.1/99.9 to 50/50.

8. The modifier according to claim 1, which is a primer for a plastic molded product.

9. A molded product, comprising the composition according to claim 6.

10. The molded product according to claim 9, wherein the molded product is a wood plastic.

11. The molded product according to claim 9, which is for a building material.

12. The molded product according to claim 9, which is for a battery separator.

13. A method for producing a modifier for polyolefin resin (K), comprising copolymerizing a polyolefin (A), an unsaturated dicarboxylic acid (anhydride) (B), and an unsaturated aliphatic hydrocarbon (C), in the presence of a radical initiator (D), wherein said (C) is a linear α-olefin or a branched α-olefin having a carbon number of 6 to 36.

14. A method of imparting wettability for water to a polyolefin resin (E), comprising allowing (E) to contain the modifier (K) according to claim 1.

15. A method of imparting an ionic impurity capturing property to a polyolefin resin (E), comprising allowing (E) to contain the modifier (K) according to claim 1.

16. The composition according to claim 6, which is a primer for a plastic molded product.

* * * * *